United States Patent
Brett et al.

(10) Patent No.: US 9,494,087 B2
(45) Date of Patent: Nov. 15, 2016

(54) STICK-RESISTANT ENGINE OVER-SPEED SHUT-DOWN VALVE

(71) Applicant: Amot Controls Corp., Houston, TX (US)

(72) Inventors: David Brett, Suffolk (GB); David Grimwade, Cambridge (GB); Simon Davies, Cambridge (GB)

(73) Assignee: AMOT CONTROLS CORP., Houston, TX (US)

(*) Notice: Subject to any disclaimer, the term of this patent is extended or adjusted under 35 U.S.C. 154(b) by 249 days.

(21) Appl. No.: 14/228,433

(22) Filed: Mar. 28, 2014

(65) Prior Publication Data
US 2015/0275774 A1    Oct. 1, 2015

(51) Int. Cl.
| | | |
|---|---|---|
| F02D 17/00 | (2006.01) | |
| F02D 9/12 | (2006.01) | |
| F02D 9/14 | (2006.01) | |
| F16K 3/06 | (2006.01) | |
| F02D 17/04 | (2006.01) | |
| F02B 3/06 | (2006.01) | |
| F02D 9/02 | (2006.01) | |

(52) U.S. Cl.
CPC . *F02D 9/12* (2013.01); *F02B 3/06* (2013.01); *F02D 9/14* (2013.01); *F02D 17/04* (2013.01); *F02D 2009/023* (2013.01); *F02D 2009/0245* (2013.01); *F16K 3/06* (2013.01)

(58) Field of Classification Search
CPC .......... F02D 9/08; F02D 9/12; F02D 9/1065; F02D 2009/0245; F02D 2009/023; F02D 11/107; F02M 3/062; F02M 3/065
USPC ................ 123/389, 391, 397, 184.56, 198 D
See application file for complete search history.

(56) References Cited

U.S. PATENT DOCUMENTS

| | | | | |
|---|---|---|---|---|
| 3,066,909 A | * | 12/1962 | Reed, Jr. | ............. F16K 5/0271 251/283 |
| 3,379,405 A | * | 4/1968 | Natho | ................... E21B 33/06 251/31 |

(Continued)

FOREIGN PATENT DOCUMENTS

| | | |
|---|---|---|
| CN | 2125006 U | 12/1992 |
| GB | 1452958 A | 10/1976 |

(Continued)

OTHER PUBLICATIONS

English language abstract for CN 2125006 U (1992).

(Continued)

*Primary Examiner* — Hai Huynh
*Assistant Examiner* — Gonzalo Laguarda
(74) *Attorney, Agent, or Firm* — Snyder, Clark, Lesch & Chung, LLP

(57) ABSTRACT

An engine shutoff valve is provided which includes a valve body having an air passageway in which a disc assembly and a valve seat assembly are located. The disc assembly includes a disc member which is arranged to be rotated and moved toward the valve seat assembly upon the occurrence of an engine runaway condition to close the valve. The valve seat assembly includes an anti-friction ring which is arranged to be engaged by the disc member when the valve is closed. The anti-friction ring is rotatable with respect to the valve body and the disc member to prevent the disc member from sticking thereto after closure of the valve, whereupon the valve can be readily reopened.

10 Claims, 2 Drawing Sheets

(56) References Cited

U.S. PATENT DOCUMENTS

| | | | | |
|---|---|---|---|---|
| 4,129,040 | A | * | 12/1978 | Hayden, Jr. .............. F02D 17/04 123/198 D |
| 4,501,238 | A | * | 2/1985 | Odum ....................... F02D 9/14 123/198 D |
| 4,537,386 | A | * | 8/1985 | Krepela ................... F02D 17/04 251/302 |
| 5,010,862 | A | | 4/1991 | Hashimoto et al. |
| 6,032,921 | A | * | 3/2000 | Krepela ................... F02D 9/06 123/198 F |
| 6,273,053 | B1 | * | 8/2001 | Krepela ................... F02D 9/14 123/198 D |
| 2001/0003277 | A1 | | 6/2001 | Oyama et al. |
| 2005/0151107 | A1 | * | 7/2005 | Shu ....................... F16K 5/0694 251/214 |

FOREIGN PATENT DOCUMENTS

| JP | H09166008 A | 6/1997 |
|---|---|---|
| JP | 2003239076 A | 8/2003 |

OTHER PUBLICATIONS

English language abstract for JP 2003239076 A (2003).
English language abstract for JP H09166008 A (1997).
United Kingdom Search Report for GB1505206.1 dated Sep. 1, 2015.

\* cited by examiner

TO AIR INLET OR INTAKE MANIFOLD
OF INTERNAL COMBUSTION ENGINE

STICK-RESISTANT ENGINE OVER-SPEED SHUT-DOWN VALVE

CROSS REFERENCE TO RELATED APPLICATIONS

N/A

FIELD OF THE INVENTION

The present invention relates to a shutoff valve, for example, an engine shutoff valve to prevent uncontrolled runaway of the engine and more particularly to engine shutoff valves that are resistant to sticking closed after an engine shutdown resulting from an overspeed condition or manual shut-down.

BACKGROUND OF THE INVENTION

Diesel engines, in the presence of combustible gases in the atmosphere, occasionally enter a runaway condition in which the engine, without a proper device to mitigate this problem, can enter an uncontrolled acceleration. In this condition, the engine experiences combustion and, if not stopped, the engine can reach speeds that can result in destruction and/or catastrophic engine failure, and personal injury. There are a number of causes of runaway including, for example, a faulty engine governor, engine overheating or the ingestion of unregulated hydrocarbons into the combustion chamber. Such hydrocarbons may be from an external source such as airborne gas, or from the engine itself due to a malfunction such as failure of turbocharger oil seals.

One conventional way to stop a runaway diesel engine involves blocking the air supply to the combustion chamber of the engine. Once deprived of oxygen, the runaway ceases. Accordingly, safety valves which cut off the air supply to the engine have been developed to shut off the engine in such a situation.

Amot Controls, Corp., the assignee of the subject invention, offers various automatic engine overspeed shutdown valves under its Chalwyn brand. Examples of such valves are those designated as the Chalwyn Bendix Range D-Valves (D29 to D80). Those valves constitute a range of small spring loaded poppet valves, each of which is arranged for placement in the air intake to the engine. Such valves employ a valve disc that designed to automatically stop an engine by closing down the air intake, e.g., the valve disc intimately engaging a valve seat, should excessive engine overspeeding occur which action increases the speed and force of the airflow through the air passageway to the engine. The closing force on the valve is provided by the intake air flow passing through the valve which operates to overcome a bias provided by a spring in the valve. As the air flow increases, the closing force builds up. This is resisted by the bias of the spring, the pre-load of which is adjustable, such that at a given air flow the resulting force overcomes the spring resistance and causes the valve to close, thus cutting off the air supply to the combustion chamber, thereby starving the engine of oxygen such that the engine stalls. Once closed, the valve will not reset to the open condition until the engine stops. This type of valve may be fitted to either naturally aspirated or turbocharged engines.

While such prior art shutoff valves have proved suitable for their intended purposes, they nevertheless leave something to be desired from the standpoint of being resistant to sticking closed once they have operated to shut off the engine. Thus, a need exists for a more stick-resistant engine overspeed shut-down valve, particularly one that is relatively simple in construction. The present invention addresses that need. All references cited herein are incorporated herein by reference in their entireties.

BRIEF SUMMARY OF THE INVENTION

This invention entails a shutoff or regulating valve for an internal combustion engine to shut off the engine in the event of an overspeed condition or upon manual operation. The valve basically comprises a valve body, a disc assembly, and a valve seat. The valve body has a fluid passageway therein through which air is enabled to flow to the internal combustion engine. The disc assembly includes a disc member movable along an axis from an open position to a closed position and vice versa. The disc member is biased and arranged when in the open position to be spaced from the valve seat to enable air to flow through the fluid passageway and when in the closed position to be in tight engagement with the valve seat thereby interrupting the flow of air through the passageway. The disc member is adapted to be automatically rotated and moved to the closed position upon an overspeed condition of the combustion engine to cause the engine to shut down. The valve seat comprises an anti-friction ring formed of material having a very low coefficient of friction, e.g., PTFE, and which is located within the valve body and has a central opening in fluid communication with the fluid passageway. The anti-friction ring is rotatably mounted within the valve body and arranged to be engaged by the disc member when the disc member is in the closed position. The anti-friction ring is able to rotate about the axis within the valve body when the engine is no longer in the overspeed condition to thereby preclude the disc member from sticking to the ring, whereupon the disc member can reassume its open state.

In accordance with one preferred aspect of this invention the valve seat comprises an annular groove in the valve body in which the anti-friction ring is disposed, with the anti-friction ring being retained in the annular groove by a retaining ring disposed thereover and with suitable clearance provided between the anti-friction ring and the annular groove to enable the anti-friction ring to rotate therein even if the anti-friction ring has expanded due to high temperature conditions in the valve.

In accordance with another preferred aspect of this invention the air flowing through the passageway applies a force on the disc member. The disc assembly comprises a spring, a center post and a Bendix nut. The spring biases the disc member towards the open position in opposition to the force produced on the disc member by air flowing through the passageway and is located within a central bore in the center post. The Bendix nut is threadedly engaged on the center post and fixedly secured to the disc member.

DETAILED DESCRIPTION OF THE PREFERRED EMBODIMENT

Figure 1:
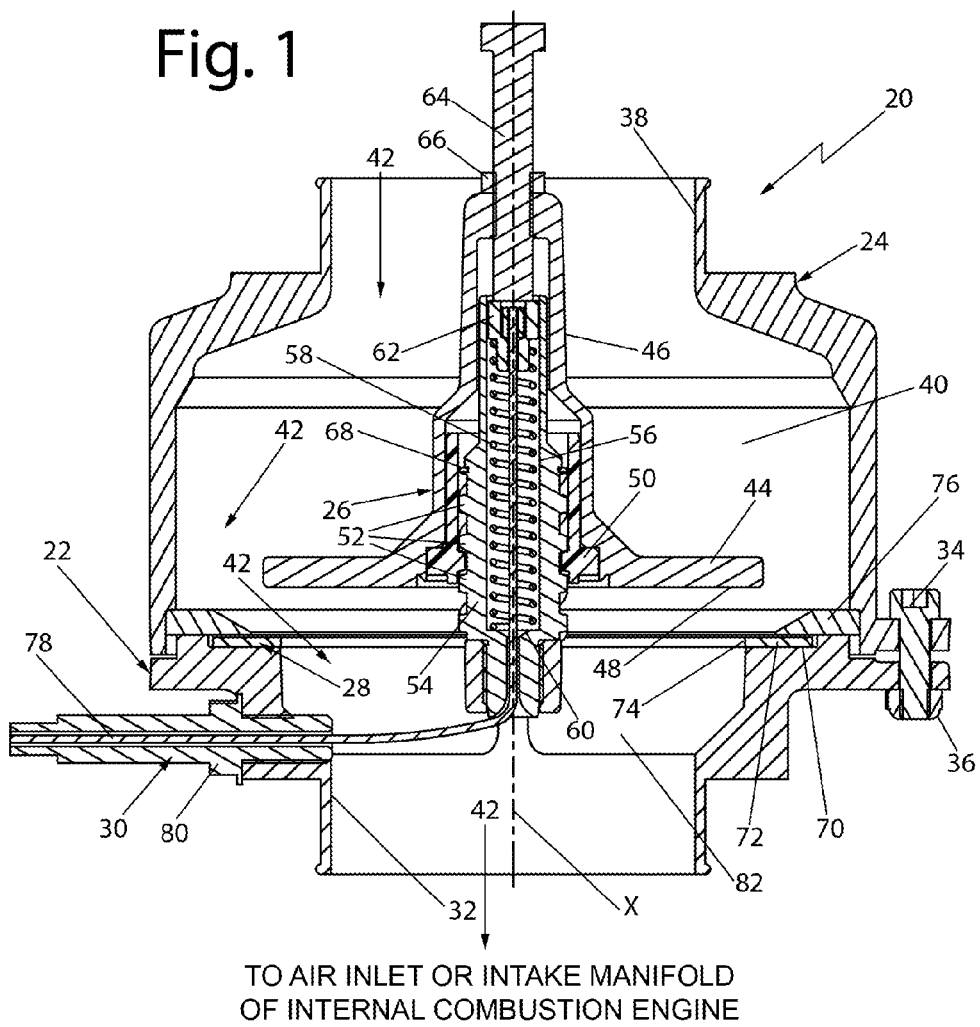
FIG. 1 is a vertical sectional view of one exemplary air shutoff valve for an engine in accordance with a preferred embodiment of the present invention, wherein the valve is shown in its open state.
Figure 2:
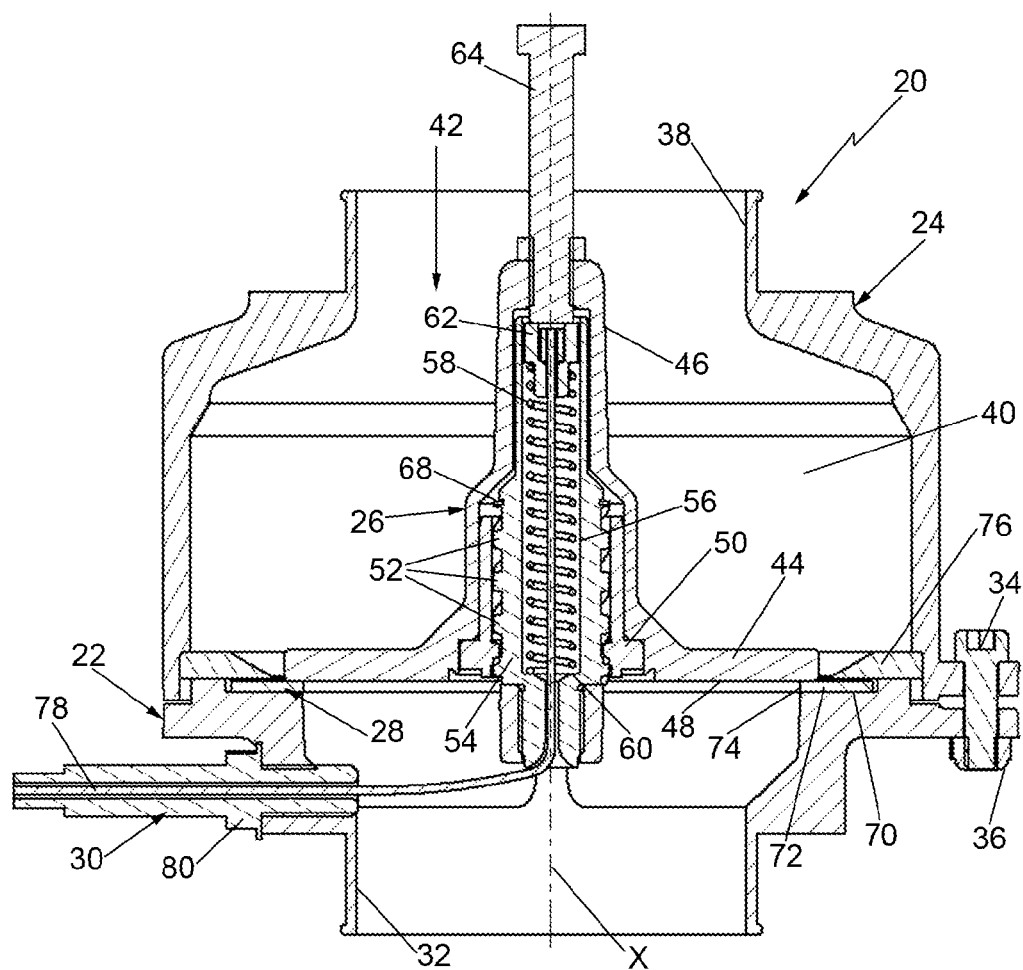
FIG. 2 is a view similar to FIG. 1, but showing the exemplary air shutoff valve of FIG. 1 in its closed state.

Referring now to the various figures of the drawing wherein like reference characters refer to like parts, there is shown in FIG. 1 one exemplary embodiment of a valve 20 constructed in accordance with one exemplary preferred embodiment of this invention. The valve 20 is similar to, for example, the Chalwyn Bendix Range D-Valves (D29 to D80) identified above, but with some significant modifications to be evident later. That valve will be described in more detail with reference to the drawing, but it should be understood that the present invention is not deemed to be limited to the specific embodiment described and shown, since that embodiment is merely exemplary of many types of embodiments of valves that can be constructed in accordance with this invention.

The valve 20, and any other valve constructed in accordance with the teachings of this invention, are preferably designed to be used in conjunction with the intake manifold of diesel engine, but can be used with any type of internal combustion engine that could exhibit a runaway condition. The basic concept of the valve is that it utilizes a disc member that is held in the open (or run) position in a path of air flow to the engine by a spring mechanism. When in the open or run position the disc member is disposed off of a valve seat, thereby allowing for free passage of intake air into the engine. The valve remains in the open position until such time as the valve is tripped, e.g., an engine overspeed condition, whereby the disc member is carried under the action of the force of the increased air flowing through the passageway onto the valve seat. In particular, the force of the increased air flow causes the disc member to rotate about an axis of the valve to move into engagement with the valve seat, thereby blocking the airflow. The restriction created by the closed disc fully throttles the engine, resulting in an engine shutdown. The movement of the disc member to close the valve can also be effected manually by an operator pulling on a cable.

Unlike other prior art valves, the valve seat of this invention is constructed so that the disc member will not stick thereto when it attempts to rotate and move back to its open position, whereupon the valve can be readily opened when desired. To that end, the valve seat comprises an anti-friction ring, e.g., a ring formed of material having a very low coefficient of friction, which located within the valve body. The anti-friction ring has a central opening in fluid communication with the air passageway and is rotatably mounted within the valve body and arranged to be engaged by the disc member when the disc member is in the closed position. The anti-friction ring is able to rotate about the central axis of the valve within the valve body when the engine is either no longer in the overspeed condition, to thereby enable the disc member to rotate backward to move it off the anti-friction ring, thereby precluding the disc member from sticking to the anti-friction ring, whereupon the disc member can reassume its open state. Preferably the valve seat comprises an annular groove in the valve body in which the anti-friction ring is disposed, with the anti-friction ring being retained in the annular groove by a retaining ring disposed thereover and with suitable clearance provided between the anti-friction ring and the annular groove to enable the anti-friction ring to rotate therein even if it has expanded due to high temperature conditions in the valve and to account for manufacturing tolerances.

Referring again to FIG. 1, it can be seen that the valve 20 basically comprises a valve body 22, a cover 24, a disc assembly 26, a valve seat assembly 28 and a manual valve shutoff cable assembly 30. The valve body 22 includes a central outlet passageway 32 arranged to be connected to the air inlet or intake manifold of an internal combustion engine (not shown). The valve body also includes a fluid, e.g., air, flow passageway 82 located above the central outlet passageway 32 and in fluid communication therewith. The valve body is formed of any suitable material, e.g., aluminum. The cover 24 is a hollow member formed of any suitable material, e.g., aluminum, and includes a flange which is secured to a portion of the valve body 22 via bolts 34 and cooperating nuts 36. The cover is a hollow member that includes a central inlet passageway 38 which is axially aligned along the central axis X of the valve 20 with the outlet passageway 32 in the valve body. The disc assembly 26 is mounted within the cover 24 and aligned with the valve seat assembly 28, as will be described shortly. Since the cover is a hollow member an air flow passageway 40 extends about the disc assembly 26 from the inlet passageway 38 to the outlet passageway 32 via the fluid flow passageway 82. When the valve is open, as shown in FIG. 1, ambient or intake air is enabled to flow in the direction of the arrow 42 into the inlet passageway 38, through the internal passageway 40 in the cover, through an opening (to be described shortly) in the valve seat assembly 28 through the fluid flow passageway 82 to the outlet passageway 32 and from there to the engine.

The disc assembly basically comprises a disc member 44, formed of any suitable material, e.g., aluminum, and has a hub 46 and a peripheral flange or disc 48 extending radially outward from the lower end of the hub. The hub is hollow and includes a Bendix™ nut 50 fixedly secured therein. In accordance with one exemplary embodiment of the invention the Bendix™ nut 50 is formed of any suitable material, e.g., plastic, and is adhesively secured in the central hub. The interior surface of the Bendix™ nut is threaded for engagement with corresponding threads 52 of a central stem or post 54. The central post 54 is fixedly secured to the valve body 22 and is centered on the central axis X. The post 54 includes a central bore 56 extending therethrough in which a helical compression spring 58 is disposed. The spring is held in place between the bottom 60 of the bore 56 and a nipple 62 located at the upper end of the bore 56. A threaded adjustment screw 64 extends through a correspondingly internally threaded hole in the top end of the stem or post 54. The nipple 62 is a hollow member arranged to be engaged by the lower end of the adjustment screw 64. The adjustment screw sets the tension of the spring which the air pressure must overcome to cause the valve to close. Thus the user of the valve can establish the setting at which the valve is designed to close by adjusting the setting of the adjustment screw. A jam nut 66 is provided extending about the adjustment screw at the top of the hub 46. When the jam nut is loosened it enables the adjustment screw to be rotated to whatever position the user desires to set the spring tension. Tightening the jam nut enables the tension setting on the spring to be locked or maintained. A stop ring 68 is provided connected to the post 54 to establish the maximum retraction of the disc member 44 with respect to the post.

The valve seat assembly 28 basically comprises an annular ledge 70 in the top portion of the valve body surrounding the outlet passageway 32. An anti-friction ring 72 of a very low coefficient of friction material, e.g., polytetrafluoroethylene (PTFE) or TEFLON®, is disposed within the ledge 70. The anti-friction ring includes a central opening 74 which is aligned with the outlet passageway 32 of the valve body. A retaining ring 76 is disposed over the annular ledge to form an annular channel in which the anti-friction ring 72 is located. The retaining ring is formed of any suitable material, e.g., aluminum, and is held in place by an undercut recess in the cover 24.

As will be described in detail later the anti-friction ring 72 is arranged to be engaged by the flange or disc 48 of the disc member 44 to close the valve 20. In order to ensure that the disc 48 does not stick to the anti-friction ring 72 and thereby prevent opening of the valve after it has been closed, the anti-friction ring is arranged to be able to rotate about the axis X within the annular channel. To that end, a small amount of planar clearance is provided between the undersurface of the retaining ring 76 and the top surface of the anti-friction ring 72 and a small amount of radial clearance is provided between the outer edge surface of the anti-friction ring 72 and the inner peripheral surface of the annular ledge 70.

Operation of the valve 20 is as follows. The valve is normally in the open position shown in FIG. 1, whereupon air flows in the direction of arrow 42 through the communicating passageways 38, 40, and 32 of the valve into the engine. If the engine should start to run away, the increased air flow passing by the flange 48 of the disc member 44 will increases the pressure on that member to overcoming the bias provided by the spring 58, whereupon the spring compresses and the disc member begins to move toward the anti-friction ring 72 of the valve seat by rotating on the post 54. As the disc member rotates on the post and moves into engagement with the anti-friction ring, the downward force provided on the disc member by the flow of air through the passageway 40 increases to thereby increase the frictional engagement at the periphery of the annular ledge 70 of the valve body. The action of the anti-friction ring mitigates that frictional effect. In particular, the anti-friction ring provides very little friction between it and the engaging face of the disc 48, whereupon the disc member can rotate with respect to the anti-friction ring and the anti-friction ring can rotate with respect to the annular ledge 70 of the valve body. This action thus enables the anti-friction ring to effectively "float" so that it is not locked down to either the valve body or the disc member when the valve is closed. Thus, when it is desired to reopen the valve, e.g., the engine has been stopped and ready to run again, the spring 58 can carry the disc member 44 back to its open position.

As mentioned above, the valve 20 is arranged to be manually closed, if desired. That feature is, however, optional. Thus, if manual closing of the valve is desired it can be accomplished by use of a cable assembly in the form of a flexible cable 78 having an external end connected to a stop handle assembly (not shown) located outside of the valve 20. The cable 78 has an internal end extending through a coupling 80 on the valve body 22 and through the center of the helical spring 58 to a connection point in the nipple 62. Thus, in order to manually close the valve 20 all that is required is for the operator to pull on a handle of the stop handle assembly so that the cable 78 pulls the spring downward, removing the spring bias force and allowing the disc member 44 to rotate freely downward and into engagement with the anti-friction ring 72 of the valve seat to thereby close the valve.

The valves of this invention are designed to operate over a wide range of intake air temperatures, and elevated pressures associated with post-turbo installation. Moreover, the valves of this invention are designed to operate in either "hard installations" such as integral with aluminum piping, or "soft installations" such as along rubber hoses.

While the invention has been described in detail and with reference to one exemplary embodiment thereof, it will be apparent to one skilled in the art that various changes and modifications can be made therein without departing from the spirit and scope thereof.

What is claimed is:

1. A shutoff or regulating valve, comprising a valve body, a disc assembly, and a valve seat, said valve body having a fluid passageway therein through which air is enabled to flow to a combustion engine, said disc assembly including a disc member movable along an axis from an open position to a closed position and vice versa, said disc member being biased and configured when in said open position to be spaced from said valve seat to enable air to flow through said fluid passageway and when in said closed position to be in tight engagement with said valve seat thereby interrupting the flow of air through said passageway, said disc member being configured to be automatically rotated and moved to said closed position upon an overspeed condition of the combustion engine to cause the engine to shutdown, said valve seat comprising an anti-friction ring located within said valve body and having a central opening in fluid communication with said fluid passageway, said anti-friction ring being rotatably mounted within said valve body and arranged to be engaged by said disc member when said disc member is in said closed position, said anti-friction ring being able to rotate about said axis within said valve body when said engine is no longer in said overspeed condition, to thereby preclude said disc member from sticking to said ring, whereupon said disc member can reassume its open state.

2. The shutoff or regulating valve of claim 1 wherein said ring is formed of polytetrafluoroethylene.

3. The shutoff or regulating valve of claim 1 wherein said valve seat comprises an annular groove in said valve body in which said ring is disposed, said ring being retained in said annular groove by a retaining ring disposed thereover.

4. The shutoff or regulating valve of claim 3 wherein suitable clearance is provided between said ring and said annular groove to enable said ring to rotate therein even if said ring has expanded due to high temperature conditions in said valve.

5. The shutoff or regulating valve of claim 1 wherein air flowing through said passageway applies a force on said disc member and wherein said disc assembly comprises a spring biasing said disc member towards said open position in opposition to the force produced on said disc member by air flowing through said passageway.

6. The shutoff or regulating valve of claim 5 wherein the amount of bias provided by said spring is adjustable.

7. The shutoff or regulating valve of claim 5 wherein said disc assembly additionally comprises a center post and a nut, said center post having a central bore in which said spring is located, said nut being threadedly engaged on said center post and fixedly secured to said disc member.

8. The shutoff or regulating valve of claim 6 wherein said disc assembly additionally comprises a center post and a Bendix nut, said center post having a central bore in which said spring is located, said nut being threadedly engaged on said center post and fixedly secured to said disc member.

9. The shutoff or regulating valve of claim 1 wherein said disc member of said valve is also configured to be manually moved to said closed position by an operator.

10. The shutoff or regulating valve of claim 9 additionally comprising a cable coupled to said disc member to effect the manual closing of said valve.

* * * * *